United States Patent Office 3,222,326
Patented Dec. 7, 1965

3,222,326
POLYMERS OF ALKYLENE THIOETHERS
Nicolas Brodoway, Claymont, Del., assignor to E. I. du Pont de Nemours and Company, Wilmington, Del., a corporation of Delaware
No Drawing. Filed Jan. 29, 1962, Ser. No. 170,535
7 Claims. (Cl. 260—79.7)

This invention is directed to novel polymeric alkylene thioethers which are prepared by polymerizing or copolymerizing certain epithio compounds as hereinafter described.

While a great many useful polymeric materials are known, the search continues for new polymeric materials to meet the widely diverse needs of an advancing technology.

It is, therefore, an object of this invention to provide a novel class of polymeric materials which materials have significant and useful elastomeric properties.

More specifically, the present invention is directed to polymers consisting of a multiplicity of units having the structures (1)

and, optionally, (2)

wherein R is selected from the group consisting of R' and R'—O—CH$_2$—, R' being selected from the group consisting of cyclic and acylic hydrocarbon radicals containing one aliphatic

group and 3 to 8 carbon atoms; R may be different in successive units, the number of said (2) units being no greater than the number of said (1) units, the polymer having a minimum inherent viscosity of 0.45, determined at 30° C. as a solution of 0.1 gram of polymer in 100 ml. of toluene.

The novel polymers of the present invention are prepared by polymerizing 1,2-epithiopropane (also known as methylthiirane or propylene sulfide), and, if desired, another epithio compound as described hereinafter, in an inert organic solvent in the presence of a catalyst of the anionic type. Suitable catalysts include alkali metals; strongly basic salts of alkali metals, such as hydroxides, sulfides, hydrosulfides, mercaptides, alkoxides and amides; metal alkyls, particularly of divalent and trivalent metals; and mercaptides of divalent and trivalent metals. Examples of suitable catalysts are sodium, lithium, sodium hydroxide, sodium sulfide, triisobutylaluminum, diethylzinc, phenylmagnesium bromide, diethylmagenesium and sodium, zinc, or aluminum salts of dodecyl mercaptan. Suitable solvents are aromatic hydrocarbons—such as benzene, toluene, and xylene—tetrachloroethylene, and thiophene. The solvent should be anhydrous.

The polymerization is carried out at a temperature ranging from 0 to 75° C. At temperatures below 0° C. the polymerization proceeds too slowly to be practical. Since the molecular weight of the polymer is adversely affected by elevated temperatures, it is preferred to carry out the polymerization at as low a temperature as is feasible. Temperatures higher than about 75° C. necessitate the use of superatomspheric pressures since 1,2-epithiopropane boils at about that temperature. It is generally more convenient to carry out the polymerization at atmospheric pressure, although higher or lower pressures may be used. The preferred temperature range is about 20° to 60° C.

The reaction should be carried out in an inert atmosphere, such as in an atmosphere of nitrogen.

These novel polymers are isolated by conventional methods. For example, the polymerization mass may be dissolved in an organic solvent, such as toluene, benzene, xylene, tetrachloroethylene, tetrahydrofuran, or chloroform, and the polymer is percipitated by adding an alcohol, such as ethanol or isopropyl alcohol. The solvents are then removed in vacuo.

The 1,2-epithiopropane may be copolymerized with other epithio compounds if desired. It is particularly advantageous to incorporate into the polymer, units having pendant radicals containing a carbon-to-carbon double bond. This provides reactive groups and facilitates the cross-linking or curing of the polymers.

Suitable monomers are compounds having the following structure:

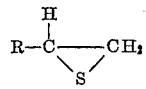

in which R is as defined heretofore.

Examples of suitable epithiocompounds which may be used as comonomers are: 4,5-epithio-1-pentene, 5,6-epithio-1-hexene, 5,6-epithio-2-hexene, 5,6-epithio-2-methyl-1-hexene, 5,6-epithio-2-methyl-2-hexene, 1,2-epithio-1-(3-cyclohexene-1-yl)ethane, 9,10-epithio-1-decene, 3-allyloxy-1,2-epithiopropane, 3-(2-butenyloxy)-1,2-epithiopropane, 3-(1-methylallyloxy)-1,2-epithiopropane, 3-(2-methylallyloxy)-1,2-epithiopropane, 3-(2-pentenyloxy)-1,2-epithiopropane, 3-(1-methyl-2-butenyloxy)-1,2-epithiopropane, 7,8-epithio-1-octene, 7,8-epithio-2-methyl-1-octene, 1,2-epithio-1-(2-cyclopenten-1-yl)ethane, 3-(3-ethyl-4-hexenyloxy)-1,2-epithiopropane, 3-(2-cyclohexene-1-yloxy)-1,2-epithiopropane, 3-(2-cyclopenten-1-yloxy)-1,2-epithiopropane, and 3-(3-methyl-4-hexenyloxy)-1,2-epithiopropane. The preferred comonomers are those which provide an unsaturated hydrocarbon radical (R' as heretofore described) containing from 3 to 6 carbon atoms. Compounds of this type are mixed with 1,2-epithiopropane and the mixture is subjected to polymerizing conditions as described above. The product is a polymeric thioether compound containing pendant groups defined herein as R. It can be seen that there R groups may be acylic or cyclic groups.

The preferred polymers of this invention are those containing 2 to 5 mole percent of the (2) units

The monomeric epithio compounds to be used as starting materials may be prepared from the corresponding epoxy compounds by reacting them with thiourea as described in J. Am. Chem. Soc. 75, 4959 (1953). The corresponding epoxy compounds may be prepared in known ways. For example, they may be prepared by the monoepoxidation of the corresponding compounds containing two carbon-to-carbon double bonds as described in J. Chem. Soc. 1950, 3131–5 and Chemical Reviews 45, 16 (1949).

The novel polymeric thioethers of this invention are elastomers which have significant utility for a wide variety of applications. They may be used, for example, in caulking compounds and as binders in paint formulations. The copolymers containing unsaturated side chains may be cured using conventional techniques applicable to other unsaturated elastomers. They show excellent resistance to solvents and oils. For example, in acetone the copolymers of the present invention show much less swelling than the nitrile rubbers which are generally considered to be outstanding in their solvent resistance. This property makes them particularly suitable for uses in which they will come in contact with solvents, such as in hose, gaskets, tank linings, etc.

They may be processed by conventional rubber processing techniques and used with conventional fillers, accelerators, antioxidants, etc.

Representative examples illustrating the present invention follow.

EXAMPLE A

A slurry is prepared consisting of 76 grams (one mole) of thiourea and 49 grams (one equivalent) of sulfuric acid in 300 ml. of water. The slurry is agitated and held at 20–25° C. while 98 grams (one mole) of 5,6-epoxy-1-hexene is added dropwise. The mixture is stirred for five hours, is allowed to stand overnight at room temperature, and is then neutralized by dropwise addition of a 20 percent aqueous solution of sodium carbonate. The 5,6-epithio-1-hexene is distilled off as an azeotrope with water under reduced pressure. A 75 percent yield of 5,6-epithio-1-hexene is obtained at 42–43.5° C. (10 mm. of Hg) by fractionation of the crude organic product.

EXAMPLE B

A slurry is prepared consisting of 76 grams (one mole) of thiourea in 300 ml. of water. The slurry is agitated and held at 10–20° C. while 114 g. (one mole) of 3-allyloxy-1,2-epoxypropane is added dropwise. The mixture is stirred for twenty hours at 5–20° C. The heavy oil formed is separated, dried over calcium chloride, and fractionated, giving a 50 percent yield of 3-allyloxy-1,2-epithiopropane boiling at 56–57° C. at 6.5 mm. Hg. The product has an index of refraction $n_D^{20}$ 1.4936, and a density $d_4^{25}$ of 1.0137.

Example 1

To 10 milliliters of anhydrous tetrachloroethylene, in a flame-dried flask under a nitrogen atmosphere, is added 0.001 mole of triisobutylaluminum as a 1 M solution in cyclohexane. To the stirred solution is added dropwise 7.4 grams (0.1 mole) of propylene sulfide during a 20-minute period. The temperature rises to a maximum of 65° C. during the addition. After stirring for six hours the viscous solution is allowed to stand for three days at room temperature under nitrogen. The solid reaction mass is dissolved in toluene and the polymer is precipitated by adding isopropyl alcohol. The volatile solvents are removed in vacuo. The solid polymer obtained weighs 5.6 grams (75% yield) and has an inherent viscosity (as a solution of 0.1 g. of polymer in 100 ml. of toluene at 30° C.) of 0.46. It is a rubbery solid having a glass transition temperature of −45° C.

Example 2

A mixture of 37 grams (0.5 mole) of propylene sulfide and 0.1 ml. of a 25 percent solution of diethyl-zinc in heptane is put into a dry flask in a nitrogen atmosphere and is stirred for six hours at 25–30° C. The mixture is then allowed to stand at room temperature for three days. The solid reaction mass obtained is dissolved in toluene and the polymer is precipitated by adding denatured alcohol (Formula 2B as described in the 1961 Lange Handbook of Chemistry, Tenth Edition, page 1781). The volatile components are removed in vacuo at room temperature for 16 hours and at 65° C. for four hours. The polymer obtained weighs 31.4 grams (85 percent yield) and has an inherent viscosity of 1.21 (as a solution of 0.1 gram of polymer in 100 ml. of tulene at 30° C.).

Example 3

A mixture of 17.5 grams (0.2375 mole) of propylene sulfide, 3.25 grams (0.025 mole) of 3-allyloxy-1,2-epithiopropane and 0.1 ml. of a 25 percent solution of diethyl-zinc in heptane is placed in a dry flask in an argon atmosphere and allowed to stand for sixteen hours at room temperature. 17.5 grams of propylene sulfide are added and the mixture is stirred for three hours, after which time the viscosity becomes too high to permit further stirring. The mixture is then allowed to stand for six days at room temperature. The solid reaction mass is then dissolved in toluene, and the polymer is precipitated by adding denatured alcohol (Formula 2B). The volatile materials are removed in vacuo. The infrared spectrum of the copolymer shows the presence of vinyl unsaturation. The inherent viscosity (as a solution of 0.1 gram of polymer in 100 ml. of toluene at 30° C.) is 1.67.

Example 4

A mixture of 42.2 grams (0.57 mole) of propylene sulfide, 3.42 grams (0.03 mole) of 5,6-epithio-1-hexene, and 0.1 ml. of a 25 percent solution of diethylzinc in heptane is put into a dry flask under a nitrogen atmosphere and is stirred for three hours at room temperature. After this time the viscosity of the solution is very high. The solution is allowed to stand for five days at room temperature. The solid reaction mass is then dissolved in toluene, the polymer is precipitated by adding denatured alcohol (Formula 2B), and the volatile components are removed in vacuo. The polymer weighs 41.4 grams, representing a 91 percent conversion of monomers. The inherent viscosity of the polymer (as a solution of 0.1 gram of polymer in 100 ml. of toluene at 30° C.) is 1.68.

The copolymer is compounded on a rubber mill using the following recipe:

| | Parts by weight |
|---|---|
| Copolymer | 100 |
| N-phenyl-2-naphthylamine | 2 |
| Semireinforcing furnace black | 50 |
| Zinc oxide | 5 |
| Sulfur | 2 |
| 2-mercaptobenzothiazole | 1 |
| Tetramethylthiuram disulfide | 1.5 |

The compounded material is cured in a mold in a press for one hour at 153° C. The tensile properties of the cured elastomer, determined by ASTM Method D-412-51 T, are:

| | |
|---|---|
| Modulus at 200% elongation, p.s.i. | 840 |
| Tensile strength at the break, p.s.i. | 1000 |
| Elongation at the break, percent | 260 |

The Yerzley resilience at 25° C. (ATSM D-945-55) is 71%.

Example 5

To measure the solvent resistance of the copolymers of this invention, a sample of the polymer of Example 4 is prepared and cured. For comparison, two butadiene-acrylonitrile elastomers are also tested. These are commercially available elastomers which are considered to be outstanding in their solvent resistance.

The polymers tested are identified as follows:

A. Butadiene-acrylonitrile copolymer containing 41% acrylonitrile
B. Butadiene-acrylonitrile copolymer containing 32% acrylonitrile
C. Copolymer of Example 4.

The curing recipes are:

| | Parts by Weight | | |
|---|---|---|---|
| | A | B | C |
| Copolymer | 100 | 100 | 100 |
| N-phenyl-2-naphthylamine | 1 | 1 | 2 |
| Semireinforcing furnace black | 50 | 50 | 50 |
| Zinc oxide | 5 | 5 | 5 |
| Stearic acid | 1 | 1 | 1 |
| Sulfur | 1 | 1 | 2 |
| Tetramethylthiuram monosulfide | 1 | 1 | |
| Tetramethylthiuram disulfide | 0.5 | 0.5 | |
| 2-Mercaptobenzothiazole | | | 1.5 |
| | | | 1 |

The copolymers A and B are cured in a mold in a press for 30 minutes at 153° C. and copolymer C is cured for 60 minutes at 153° C.

Weighed samples of the cured polymers are immersed in the solvent and are held at room temperature for eight days. The surface of each sample is then blotted free of excess solvent, and the sample is weighed in a tared closed container. Weight gains are converted to volume increase.

The volume increase of the cured samples in various solvents is shown below.

| Solvent | Percent Volume Increase | | |
|---|---|---|---|
| | A | B | C |
| Acetone | 170 | 160 | 27 |
| Tricresyl phosphate | 16 | 34 | 11 |
| Dioctyl phthalate | 5 | 23 | 11 |
| Toluene | 116 | 160 | 116 |
| Heptane | 4 | 12 | 9 |
| ASTM Oil No. 3* | 10 | 21 | 20 |

*Held in the oil eight days at 100° C.

The preceding representative examples may be varied within the scope of the present total specification disclosure, as understood and practiced, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An elastomeric polymer selected from the group consisting of (A) a multiplicity of monomer units of the structure (1) 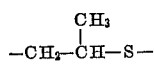

and (B) a multiplicity of said (1) monomer units together with monomer units of the structure (2) 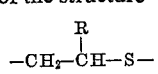

wherein R of said monomer unit (2) is independently selected from the group consisting of R' and R'—O—CH$_2$—, said R' being selected from the group consisting of cyclic and acyclic hydrocarbon radicals containing one aliphatic carbon-to-carbon double bond and 3 to 8 carbon atoms; the number of said (2) units being no greater than the number of (1) units; said polymer having a minimum inherent viscosity of 0.45, determined at 30° C. as a solution of 0.1 gram of polymer in 100 ml. of toluene.

2. An elastomeric polymer according to claim 1, which polymer consists essentially of said monomer unit

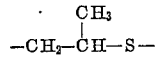

3. An elastomeric copolymer according to claim 1 wherein said R is allyloxymethyl.

4. An elastomeric copolymer according to claim 1 wherein said R is 3-butenyl.

5. A sulfur-curable, elastomeric polymer consisting of a multiplicity of monomer units (1) 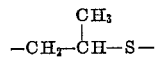

together with from about 2 to 5 mole percent of monomer units (2) 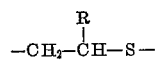

wherein R of said monomer unit (2) is independently selected from the group consisting of R' and R'—O—CH$_2$—, said R' being selected from the group consisting of cyclic and acyclic hydrocarbon radicals containing one aliphatic carbon-to-carbon double bond and 3 to 8 carbon atoms; the number of said (2) units being no greater than the number of (1) units; said polymer having a minimum inherent viscosity of 0.45, determined at 30° C. as a solution of 0.1 gram of polymer in 100 ml. of toluene.

6. A sulfur-curable, elastomeric copolymer according to claim 5 wherein said R is allyloxymethyl.

7. A sulfur-curable, elastomeric copolymer according to claim 5 wherein said R is 3-butenyl.

References Cited by the Examiner

UNITED STATES PATENTS

| | | | |
|---|---|---|---|
| 2,183,860 | 12/1939 | Coltof | 260—79 |
| 2,185,660 | 1/1940 | Coltof et al. | 260—79 |
| 2,724,719 | 11/1955 | Markley et al. | 260—327 XR |
| 2,891,072 | 6/1959 | Remes et al. | 260—327 |
| 3,000,865 | 9/1961 | Gorgiolo | 260—79 |
| 3,071,593 | 1/1963 | Warner | 260—327 |

JOSEPH L. SCHOFER *Primary Examiner.*

J. R. LIBERMAN, *Examiner.*